United States Patent
Terwilliger et al.

(10) Patent No.: US 12,338,751 B2
(45) Date of Patent: Jun. 24, 2025

(54) CENTRIFUGAL WATER MOLECULAR SEPARATION

(71) Applicant: RTX CORPORATION, Farmington, CT (US)

(72) Inventors: Neil J. Terwilliger, Cheshire, CT (US); Andressa L. Johnson, Kailua, HI (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/458,696

(22) Filed: Aug. 30, 2023

(65) Prior Publication Data

US 2025/0075641 A1 Mar. 6, 2025

(51) Int. Cl.
*F01K 23/10* (2006.01)
*F01K 3/26* (2006.01)
*F01K 7/16* (2006.01)

(52) U.S. Cl.
CPC .............. *F01K 23/10* (2013.01); *F01K 3/26* (2013.01); *F01K 7/16* (2013.01); *F05D 2220/323* (2013.01)

(58) Field of Classification Search
CPC .. F02C 3/30; F02C 3/305; F02C 7/224; F02K 1/822; F02K 1/825; F02K 1/40
See application file for complete search history.

(56) References Cited

U.S. PATENT DOCUMENTS

| 3,799,249 | A | * | 3/1974 | Linhardt | F17C 9/02 261/153 |
| 5,628,183 | A | | 5/1997 | Rice | |
| 7,837,752 | B2 | | 11/2010 | Darke et al. | |
| 11,603,798 | B1 | * | 3/2023 | Terwilliger | F02C 7/18 |
| 11,635,022 | B1 | | 4/2023 | Terwilliger et al. | |
| 2009/0173073 | A1 | | 7/2009 | Guidati et al. | |
| 2015/0000298 | A1 | * | 1/2015 | McAlister | F02C 7/16 60/39.12 |
| 2018/0334959 | A1 | * | 11/2018 | Jagtap | F02C 6/18 |
| 2021/0207500 | A1 | | 7/2021 | Klingels et al. | |
| 2023/0258106 | A1 | * | 8/2023 | Terwilliger | F01K 15/02 60/775 |

FOREIGN PATENT DOCUMENTS

WO 2022223073 A1 10/2022

OTHER PUBLICATIONS

Extended European Search Report for European Application No. 24197743.8 mailed Feb. 4, 2025.

* cited by examiner

Primary Examiner — Thuyhang N Nguyen
(74) Attorney, Agent, or Firm — Carlson, Gaskey & Olds, P.C.

(57) ABSTRACT

An aircraft propulsion system includes a condenser at least partially disposed within the core flow path where water is extracted from the exhaust gas flow, an evaporator system that is at least partially disposed within the core flow path upstream of the condenser where thermal energy from the exhaust gas flow is utilized to generate a steam flow from at least a portion of water that is extracted by the condenser. Steam within the exhaust gas flow is concentrated into a portion of the exhaust gas flow that is communicated through the condenser.

19 Claims, 6 Drawing Sheets

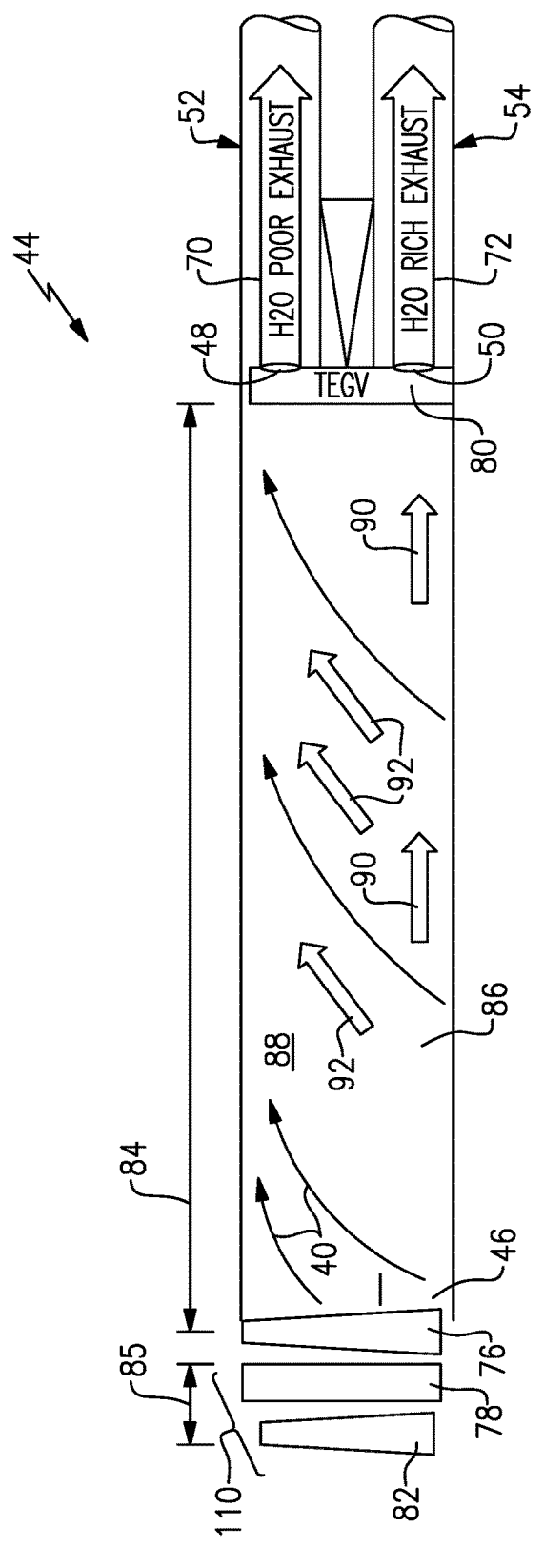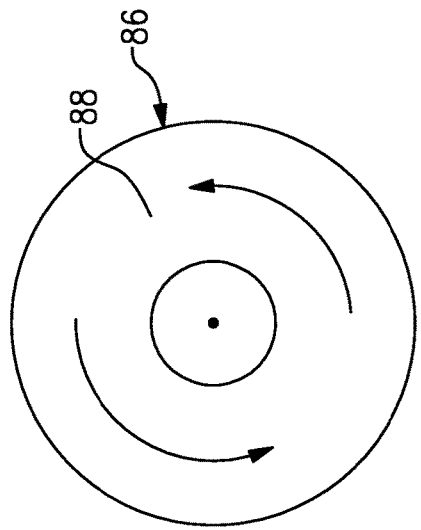
FIG.2
FIG.3

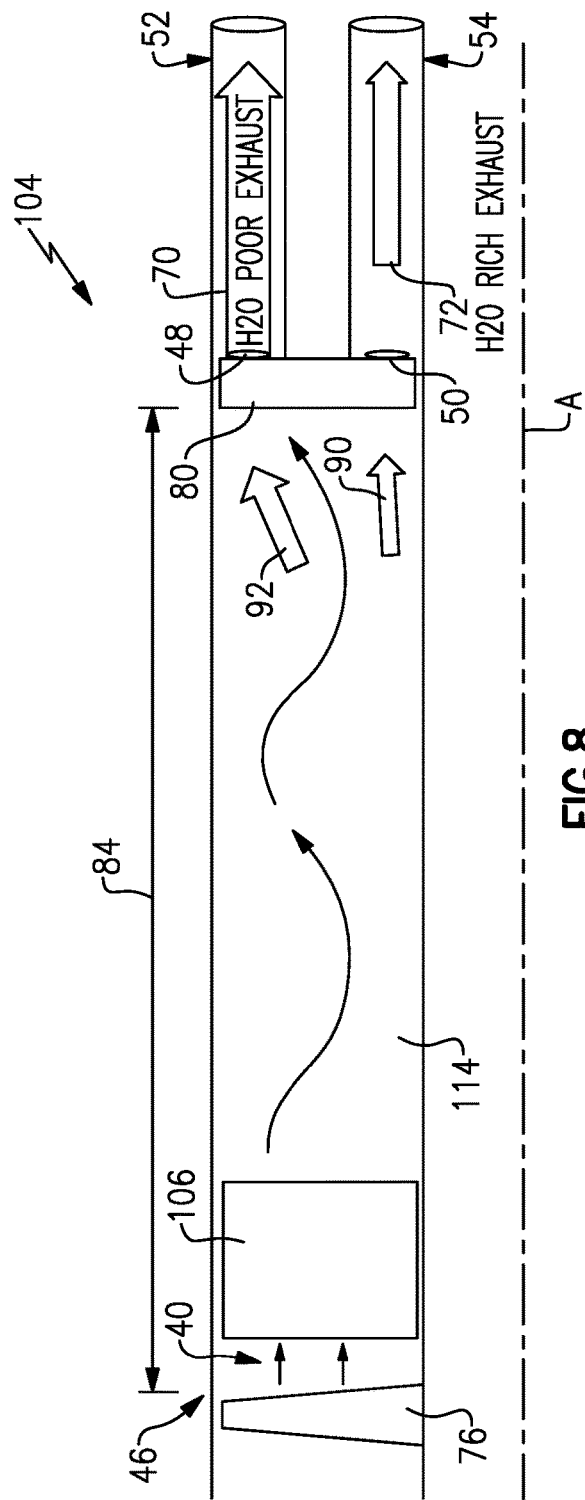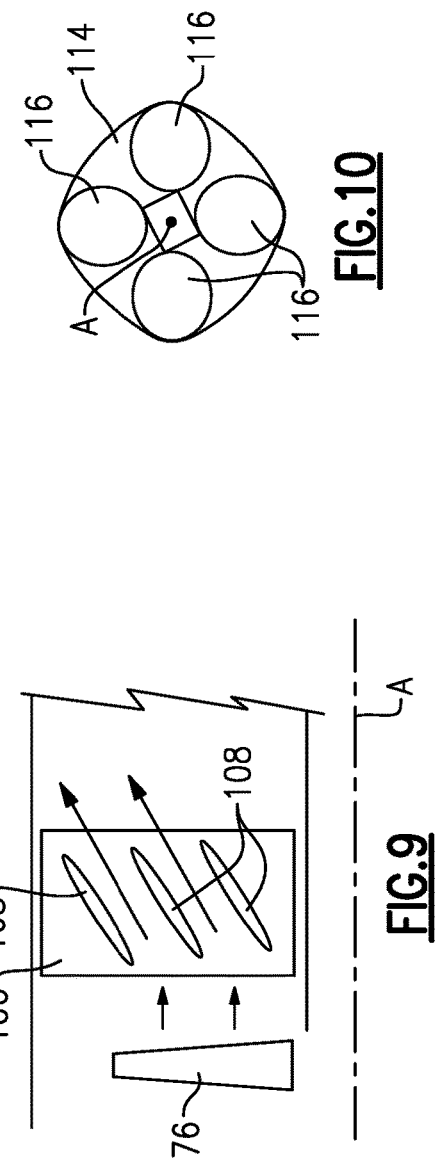

CENTRIFUGAL WATER MOLECULAR SEPARATION

TECHNICAL FIELD

The present disclosure relates generally to an aircraft propulsion system that includes a steam generation system transforming recovered water into a steam flow for injection into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Exit steam from the turbine section is diluted with air including nitrogen, carbon dioxide and oxygen. The additional components can reduce water extraction efficiency.

SUMMARY

An aircraft propulsion system according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, a condenser at least partially disposed within the core flow path where water is extracted from the exhaust gas flow, an evaporator system that is at least partially disposed within the core flow path upstream of the condenser where thermal energy from the exhaust gas flow is utilized to generate a steam flow from at least a portion of water that is extracted by the condenser for injection into a core flow path, and a core exhaust gas separator where the exhaust gas flow is separated into a first exhaust gas flow and a second exhaust gas flow. The second exhaust gas flow contains a higher concentration of steam than the first exhaust gas flow.

In a further embodiment of the foregoing aircraft propulsion system, only the second exhaust gas flow is communicated to the condenser.

In a further embodiment of any of the foregoing aircraft propulsion systems, thermal energy from both the first exhaust gas flow and the second exhaust gas flow is communicated to the evaporator system for generating the steam flow.

In a further embodiment of any of the foregoing aircraft propulsion systems, the second exhaust gas flow is smaller than the first exhaust gas flow.

In a further embodiment of any of the foregoing aircraft propulsion systems, the core exhaust gas separator is configured to utilize a radially directed flow to separate components of the exhaust gas flow by molecular weight.

In a further embodiment of any of the foregoing aircraft propulsion systems, core exhaust gas separator includes an outer outlet that is in communication with a first exhaust gas passage for the first exhaust gas flow and an inner outlet that is in communication with a second exhaust passage for the second exhaust gas flow.

In a further embodiment of any of the foregoing aircraft propulsion systems, the core exhaust gas separator includes a separator portion that is disposed within an axial length between a rotating blade of the turbine section and an exit guide vane and the outer outlet and the inner outlet are disposed proximate the exit guide vane.

In a further embodiment of any of the foregoing aircraft propulsion systems, the core exhaust gas separator includes a separator portion that is disposed within an axial length between a rotating blade of the turbine section and an exit guide vane and inner outlet is disposed upstream of the exit guide vane and at an angle relative to an engine longitudinal axis.

In a further embodiment of any of the foregoing aircraft propulsion systems, the inner outlet is only partially annular about the longitudinal axis.

In a further embodiment of any of the foregoing aircraft propulsion systems, separator portion includes a radially outward curved portion for increasing rotational acceleration of the exhaust gas flow.

In a further embodiment of any of the foregoing, the aircraft propulsion system further includes a fixed swirling vane assembly that is disposed within the separator portion that is configured to induce swirling in exhaust gas flow that enters the separator portion. The fixed swirling vane assembly includes multiple swirling vanes that are spaced circumferentially about an axis of rotation within the separator portion.

In a further embodiment of any of the foregoing aircraft propulsion systems, the rotating blade includes an aft most rotating blade and the turbine section includes a second rotating blade immediately upstream of the aft most rotating blade without a stator vane disposed therebetween.

In a further embodiment of any of the foregoing aircraft propulsion systems, the core exhaust gas separator is annular about an engine axis.

A steam generation system for a turbine engine assembly, the water extraction system according to an exemplary embodiment of this disclosure includes, among other possible things, a core exhaust gas separator where an exhaust gas flow is separated into a first exhaust gas flow and a second exhaust gas flow, the second exhaust gas flow contains more water than the first exhaust gas flow and is less than the first exhaust gas flow, the core exhaust gas separator is configured to utilize a radially directed flow to separate components of the exhaust gas flow by molecular weight, a condenser where the second exhaust gas flow is received and water is extracted, and an evaporator system where thermal energy from the exhaust gas flow is utilized to generate a steam flow from at least a portion of water that is extracted by the condenser for injection into a core flow path of a turbine engine.

In a further embodiment of the foregoing steam generation system, core exhaust gas separator includes an outer outlet that is in communication with a first exhaust gas passage for the first exhaust gas flow and an inner outlet that is in communication with a second exhaust passage for the second exhaust gas flow.

In a further embodiment of any of the foregoing steam generation systems, the separator portion includes a radially outward curved portion for increasing rotational acceleration of the exhaust gas flow.

In a further embodiment of any of the foregoing, the steam generation system further includes a fixed swirling vane assembly that is disposed within the separator portion that is configured to induce swirling in exhaust gas flow that enters the separator portion.

A method of generating steam for injection into a core flow path of a turbine engine, the method according to an exemplary embodiment of this disclosure includes, among other possible things, separating an exhaust gas flow into a first exhaust gas flow and a second exhaust gas flow, the second exhaust gas flow contains more water than the first exhaust gas flow and is less than the first exhaust gas flow, cooling the second exhaust gas flow to condense water into a liquid form, and extracting liquid water from the second exhaust gas flow.

In a further embodiment of the foregoing, the method further includes heating the extracted liquid water to generate a steam flow for communication to a core flow path.

In a further embodiment of any of the foregoing methods, separating the exhaust gas flow includes generating a swirling flow in the exhaust gas flow to communicate heavier components through an outer outlet as part of the first exhaust gas flow and communicating more water through an inner outlet that the outer outlet as the second exhaust gas flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic view of an example core exhaust gas separator embodiment.

FIG. 3 is an axial view of the example core exhaust separator embodiment.

FIG. 8 is a schematic view of still another example core exhaust gas separator embodiment.

FIG. 9 is a schematic view of an example fixed swirling vane assembly.

FIG. 10 is an axial view of another example fixed swirling vane assembly.

DETAILED DESCRIPTION

Figure 1:
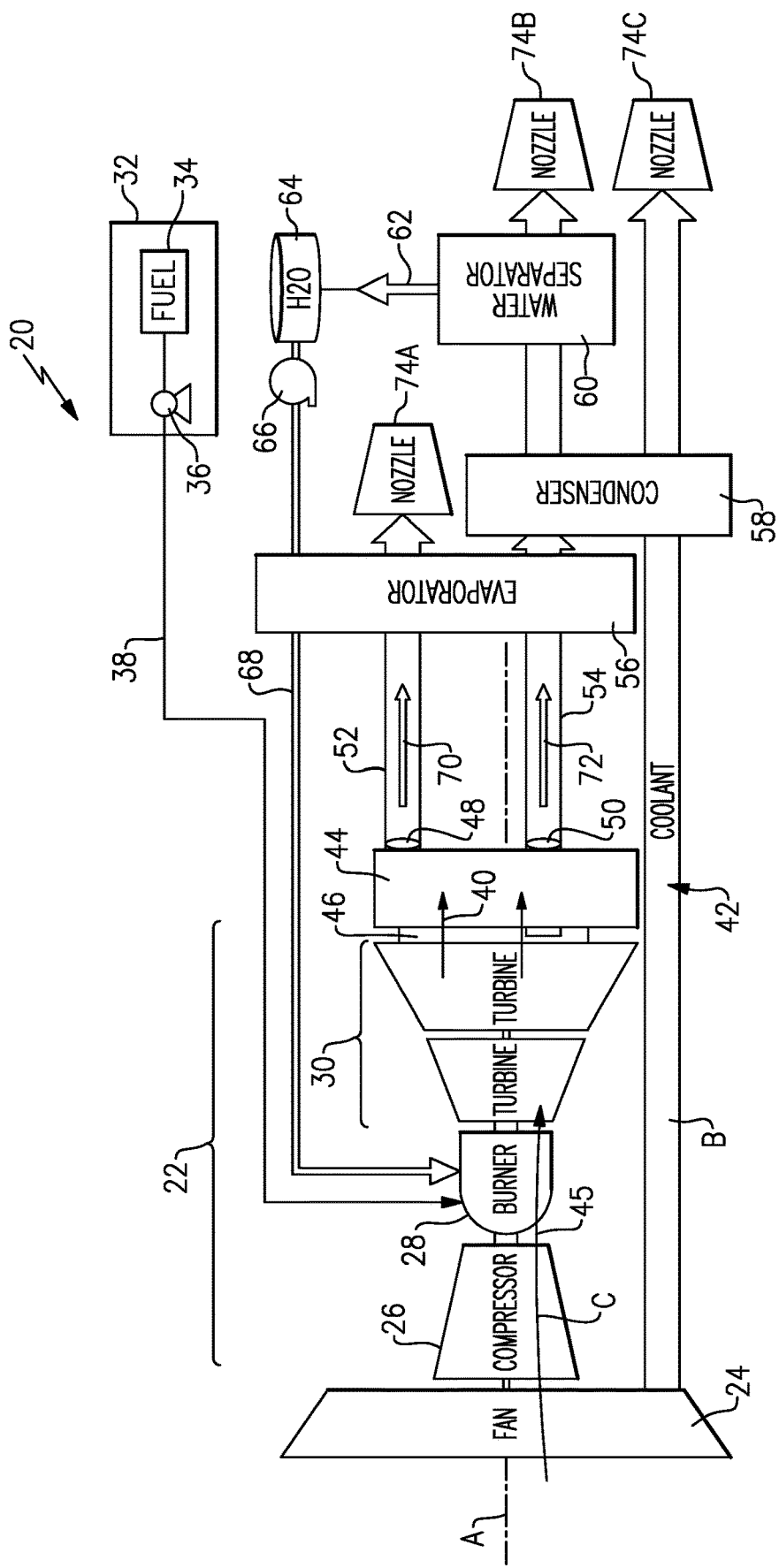
FIG. 1 is a schematic view of an example aircraft propulsion system embodiment.

FIG. 1 schematically illustrates an example propulsion system 20 that includes an exhaust gas separator 44 for generating a water enriched gas stream for communication to a condenser 60. The remaining portion of exhaust gas is not routed through the condenser 60. Water condensation and extraction from the exhaust gas flow is improved by condensing only a portion of the exhaust gas flow that includes an increased moisture content.

The example propulsion system 20 includes a fan section 24 and a core engine 22. The core engine 22 includes a compressor section 26, a combustor section 28 and the turbine section 30 disposed along an engine longitudinal axis A. The fan section 24 drives inlet airflow along a bypass flow path B, while the compressor section 26 draws air in along a core flow path C. The inlet airflow is compressed and communicated to the combustor section 28 where the compressed core airflow is mixed with a fuel flow 38 and ignited to generate the exhaust gas flow 40. The exhaust gas flow 40 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 including at least a fuel tank 34 and a fuel pump 36 to provide the fuel flow 38 to the combustor 28. The example fuel system 32 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

An evaporator system 56, a condenser 58 and a water separator 60 are disposed downstream of the turbine section 30 and receive portions of the exhaust gas flow 40. The evaporator system 56 utilizes thermal energy from the exhaust gas flow 40 to generate a steam flow 68 from water 62 extracted by the condenser 58 and separated by the water separator 60. Extracted water 62 is gathered in a tank 64 and pressurized by a pump 66 for communication to the evaporator system 56. In one disclosed example, a bypass airflow 42 is utilized as a cold sink to cool the exhaust gas flow within the condenser 58. Other cold sink flows, such as fuel flow 38 may be utilized within the condenser 58 and are within the contemplation and scope of this disclosure.

The steam flow 68 from the evaporator 56 is communicated to the combustor 28 and combined with a core flow 45 to increase mass flow through the turbine section 30 and thereby increase engine power and efficiency. The propulsion system 20 has an increased power output utilizing the injected steam flow 68 due to increased mass flow through the turbine section 30 without a corresponding increase in work from the compressor section 26. Although the example steam flow 68 is shown as injected into the combustor 28, the steam flow 68 may be injected at other locations along the core flow path C and remain with the contemplation of this disclosure. For example, some or all of the steam flow 74 could be injected in an inlet of the propulsion system 20, the compressor section 26, and/or the turbine section 30.

The exhaust gas flow 40 is a mix of steam, and components from combustion of fuel. The components from combustion can include, among other possible components, nitrogen, carbon dioxide and oxygen. These combustion components reduce the efficiency of the condenser 56 in condensing liquid water from the exhaust gas flow 40. Moreover, the bypass airflow 42 has a limited capacity for cooling that may further reduce condenser efficiencies. The example propulsion system provides for increased condenser efficiencies by separating the exhaust gas flow 40 into a first exhaust gas flow 70 and a second exhaust gas flow 72 with the core exhaust gas separator 44. Steam and water is accumulated in the second exhaust gas flow 72 and only the second exhaust gas flow 72 is communicated to the condenser 58.

The separator 44 receives the exhaust gas flow 40 through an inlet 46 and communicates the first exhaust gas flow 70 through an outer outlet 48 into a first exhaust gas passage 52. The separator 44 communicates the second exhaust gas flow 72 through an inner outlet 50 into a second exhaust gas passage 54. Thermal energy from each of the first and second exhaust gas flows 70, 72 are communicated to the evaporator 56 to provide for the generation of the steam flow 68. The second exhaust gas flow 70 is communicated to the condenser 56 where water is condensed and separated by the water separator 60. In one disclosed example, the second exhaust gas flow 72 is of smaller flow volume than that of the first exhaust gas flow 70.

Each of the first and second exhaust gas flows 70, 72 are ultimately exhausted to the ambient environment through a nozzle. In this example, separate nozzles 74A, 74B and 74C are shown for each of the first and second exhaust gas flows 70, 72 and the bypass airflow 42. The nozzles 74A, 74B and 74C may be a single nozzle having a common outlet, a single nozzle having different outlet paths or separate nozzles. The specific configuration of the nozzles 74A, 74B and 74C may vary based on application specific parameters and requirements and remain within the contemplation and scope of this disclosure.

Referring to FIGS. 2 and 3, with continued reference to FIG. 1, the example separator 44 is schematically shown and utilizes swirling flows to separate heavier components produced by combustion from lighter water. For example, the components produced during combustion such as nitrogen, oxygen and carbon dioxide have molecular weights of 28, 32 and 44 respectively. Water has a molecular weight of 18. The example separator 44 utilizes the swirling flow of exhaust gas 40 from the turbine section 30 to separate the components from the water. FIG. 2 schematically illustrates the components of combustion as arrows 92 and water as arrows 90. The heavier components 92 are driven radially outward toward the outer outlet 48. The lighter water 90 is not driven radially outward as far and is communicated through the inner outlet 50. Separation of the components 92 and water 90 is not total as some portion of the components 92 and water 90 will be communicated through each of the outer and inner outlets 48, 50. The resulting first and second exhaust gas flows 70, 72 are not a total separation. However, the resulting second exhaust gas flow 72 contains proportionally more water 90 than that of the first exhaust gas flow 70. The percent difference in water content between the first and second exhaust gas flows 70, 72 may be small, but is quantifiable and sufficient to provide improved condenser efficiencies or sizing.

In one example embodiment, the second exhaust gas flow 72 includes more than 5% more water than that of the first exhaust gas flow. In another example embodiment, the second exhaust gas flow 72 includes more than 20% more water than that of the first exhaust gas flow 70. For example, if the first exhaust gas flow includes five parts water per 100 parts of mass flow, the second exhaust gas flow 72 may include more than six parts water per 100 parts of mass flow, a 20% increase. Although example ranges of water content are disclosed by way of example, other differences in water content are within the contemplation and scope of this disclosure and may provide for increased condenser efficiencies.

The example separator 44 is disposed within an axial length 84 between an aft most rotating turbine blade 76 and a turbine exit guide vane (TEGV) 80. A separator portion 86 within the axial length 84 provides space and time for the swirling flow exiting the turbine section 30 to generate separation of the components 92 from the water 90. In one disclosed example, the separator portion 86 is an annular cavity 88 disposed along the engine axis A. More of the heavier components 92 are driven radially outward and exit through the outer outlet 48 into the first exhaust gas passage 52 than exit through the inner outlet 50. Similarly, more of the lighter water 90 exits the cavity 88 through the inner outlet 50 than through the outer outlet 48 to generate the water enriched second exhaust gas flow 72.

The example turbine section 30, includes the aft-most rotating blade 76, a stator 78 and a second rotating blade 82. Each of the aft rotating blade 76, stator 78 and second rotating blade 82 represent a row of blades supported on a corresponding rotating rotor or fixed static structure in the case of the stator 78. Exhaust gas flow 40 exiting the aft-most rotating blade 76 has some circumferential flow component that generates a swirling flow. The example separator 44 does not include features that induce the swirling flow, but instead provides the separator portion 86 within an axial distance that provides the space and time for the swirling exiting exhaust gas flow 40 to induce some separation of the components 92 from the water 90. The example axial length 84 may be any length that is determined to provide sufficient space and time to induce sufficient separation for generation of the water enriched second exhaust gas flow 72. In one example embodiment, the axial length 84 is more than ten (10) times an axial length 85 of a turbine stage 110 including the second blade 82 and the stator 78. In another example embodiment, the axial length 84 is between ten (10) and fifty (50) times the axial length of the turbine stage 110. Although axial lengths are disclosed by example, other axial lengths may be utilized and are within the contemplation and scope of this disclosure.

Figure 4:
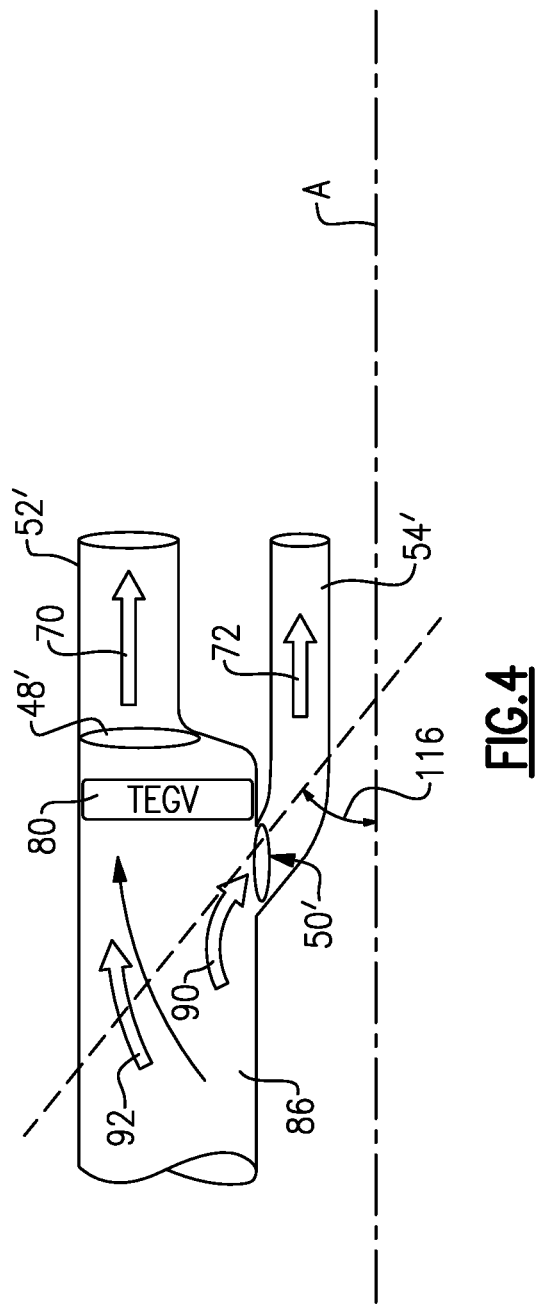
FIG. 4 is a schematic view of another example core exhaust separator embodiment.
Figure 5:
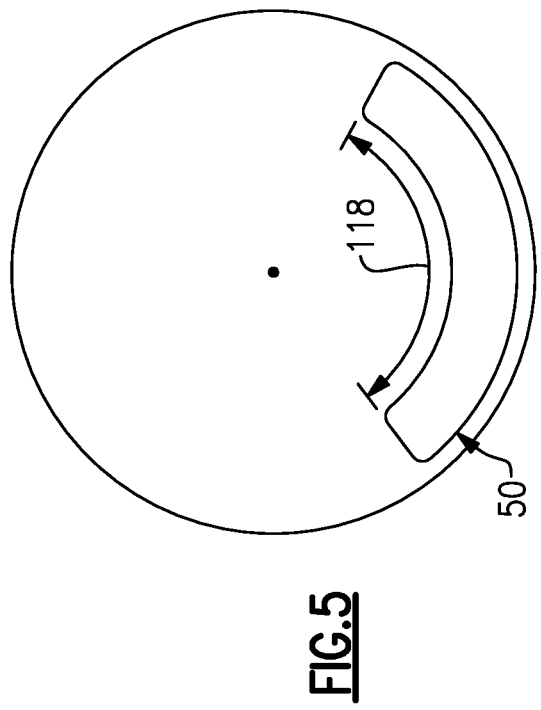
FIG. 5 is an axial schematic view of a portion of the example core exhaust separator shown in FIG. 4.

Referring to FIGS. 4 and 5, in another disclosed example an inner outlet 50' is disposed upstream of the TEGV 80 and is disposed at an angle 116 relative to the axis A. The inner outlet 50' is further only partially annular. FIG. 5 is a schematic view of an axial cross-section through the inner outlet 50' and is disposed only a partial annular distance 118.

Figure 6:
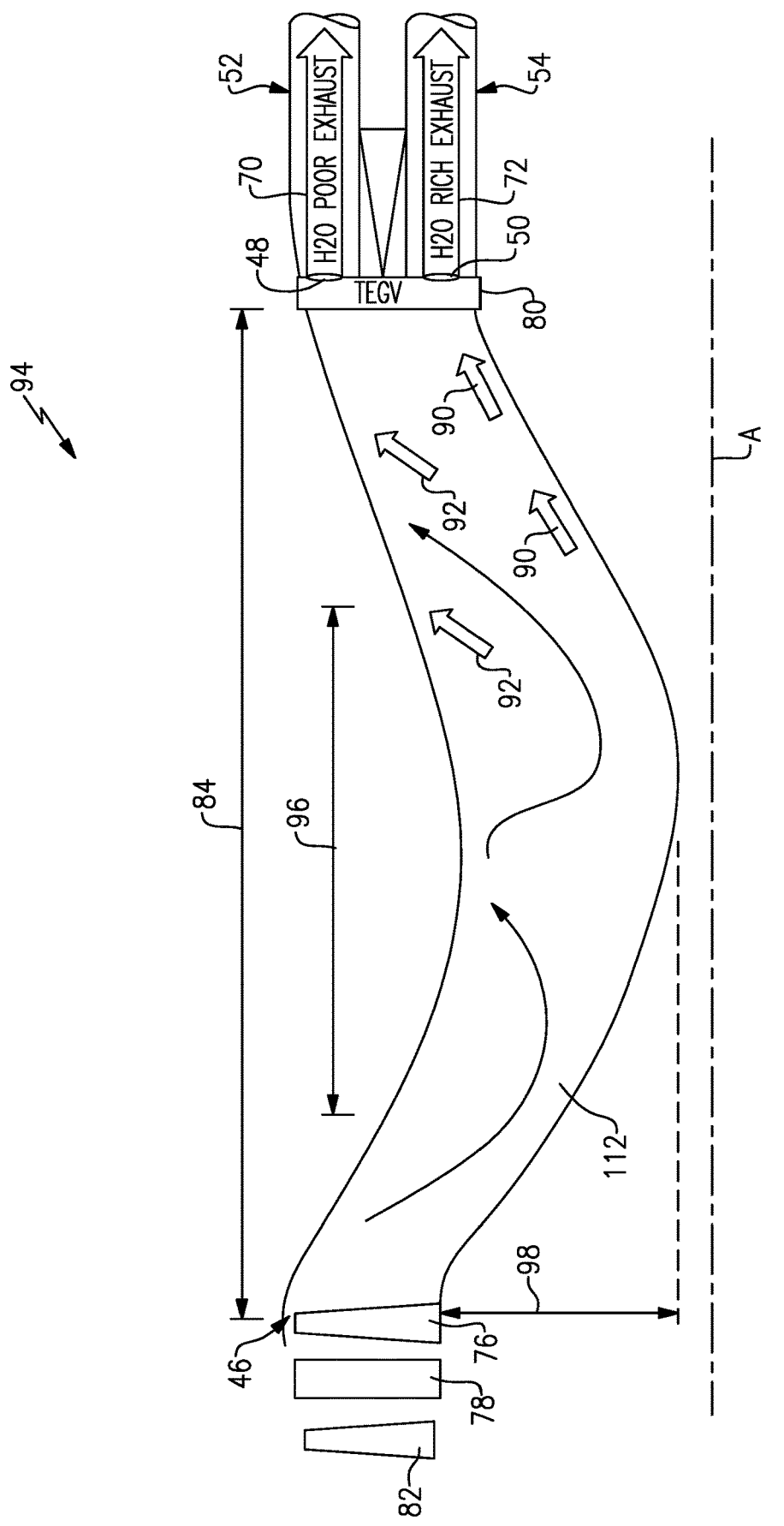
FIG. 6 is a schematic view of another example core exhaust gas separator embodiment.

Referring to FIG. 6 with continued reference to FIG. 1, another example separator 94 is shown schematically and includes a radially curved portion 96 within the axial length 84. A separator portion 112 includes the curved portion 96 to facilitate acceleration of the components 92 to enhance separation. In this example, the curved portion 96 is bent inward a radial distance 98 toward the axis A. The example radial distance 98 is shown schematically and exaggerated to illustrate a configuration that may provide increased separation without significant additional structures. The radial distance 98 may be much smaller than shown to accommodate engine structures. As in the previous disclosed example, the components 92 are driven radially outward toward the outer outlet 48. The water 90 is communicated through the inner outlet 50. The separation of at least some of the components 92 into the first exhaust gas flow 70 provides for the second exhaust gas flow 72 to have a greater concentration of water 90 to improve combustor efficiency.

Figure 7:
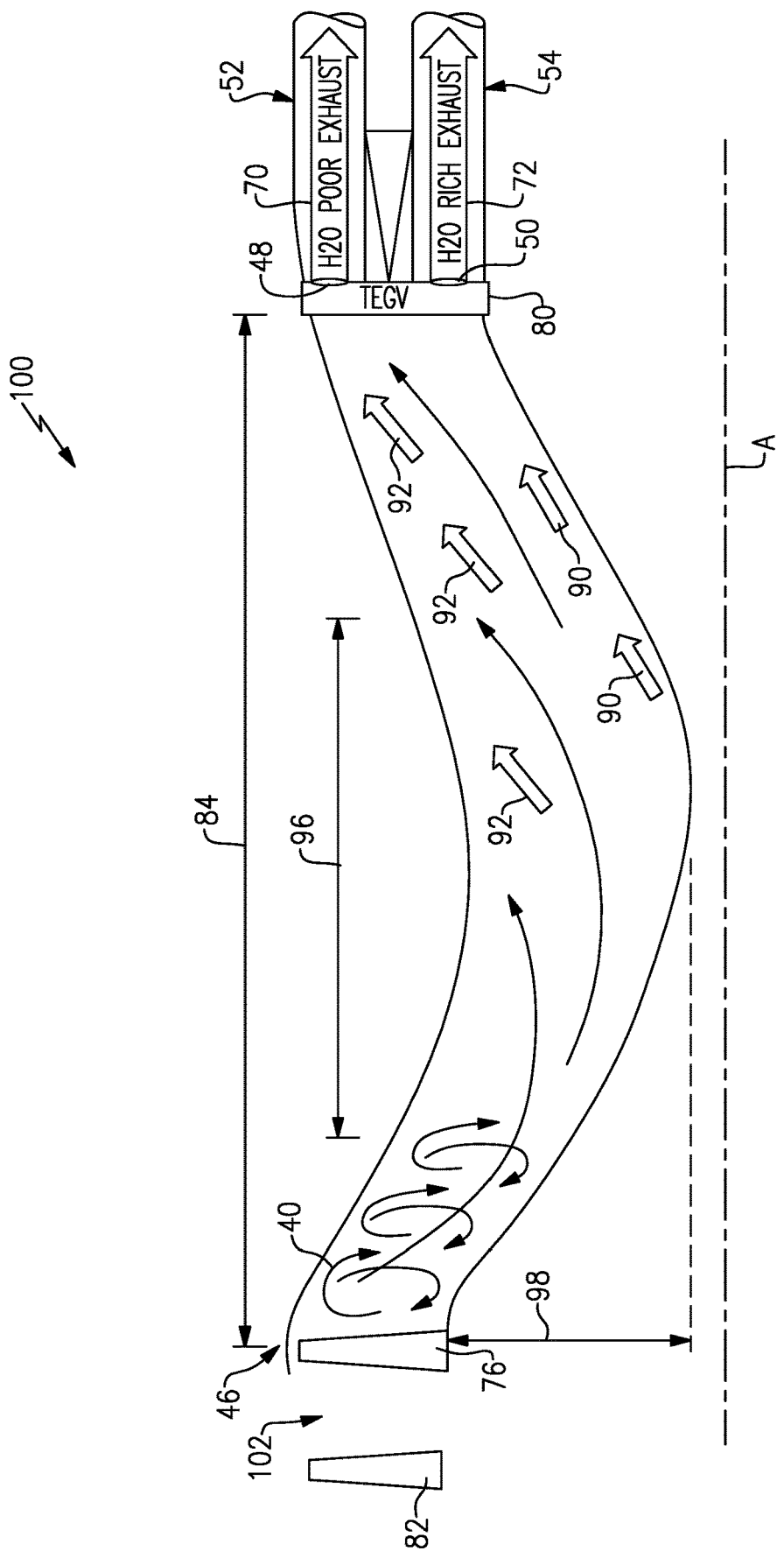
FIG. 7 is a schematic view of yet another example core exhaust gas separator embodiment.

Referring to FIG. 7, another example separator 100 is schematically shown and includes the curved portion 96 without the stator 78 (illustrated in FIG. 4), and instead includes an open space 102. The curved portion 96 induces swirling by accelerating the exhaust gas flow. The elimination of the stator 78 provides an additional feature for further enhancing swirling flow. The stator 78 straightens and orientates flow between rotating turbine blades 82, 76. In this example, by removing the stator 78, the exhaust gas flow 40 begins to swirl prior to and/or upon exiting the aft-most turbine blade 76. The additional swirling provides additional forces that drive the heavier component flows 92 radially outward into the first exhaust gas passage 52. In this example, the elimination of the last stator 78 is combined with the curved portion 96. However, elimination of the last stator 78 could be implemented without the curved portion 96 and remain within the contemplation of this disclosure.

Referring to FIGS. 8 and 9 with continued reference to FIG. 1, another example separator 104 is shown and includes a swirler 106 for inducing a swirling flow into the exhaust gas flow 40 aft of the aft-most blade 76. The example swirler 106 includes a plurality of fixed vanes 108 (FIG. 9) that induces a swirling flow that provides the driving force utilized to separate the components 92 from the water 90. The plurality of vanes 108 may be disposed anywhere within separator portion 114 in the axial length 84. The number and angular orientation of the vanes 108 is configured to generate a desired swirling flow component to facilitate separation. The vanes 108 may be disposed annularly about the axis A. The vanes 108 may spirally wrap about the axis A within the separator portion 114.

Referring to FIG. 10, another example separator portion 114 may include individual swirlers 116 circumferentially spaced apart about the axis A. Each of the swirlers 116 may induce a swirling flow component that provides for separation of the components 92 and water 90. Although different swirler configurations are disclosed by way of example, other swirler configurations could be utilized and are within the contemplation of this disclosure.

Accordingly, the example propulsion system 20 provides for improved condenser efficiency by generating a water enriched gas stream for communication to the condenser 60.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a compressor section where an inlet airflow is compressed;
a combustor section where the compressed inlet airflow is mixed with fuel and ignited to generate an exhaust gas flow that is communicated through a core flow path;
a turbine section through which the exhaust gas flow expands to generate a mechanical power output;
a condenser at least partially disposed within the core flow path where water is extracted from the exhaust gas flow;
an evaporator system at least partially disposed within the core flow path upstream of the condenser where thermal energy from the exhaust gas flow is utilized to generate a steam flow from at least a portion of water extracted by the condenser for injection into a core flow path; and
a core exhaust gas separator where the exhaust gas flow is separated into a first exhaust gas flow and a second exhaust gas flow, wherein the second exhaust gas flow contains a higher concentration of steam than the first exhaust gas flow and only the second exhaust gas flow is communicated to the condenser.

2. The aircraft propulsion system as recited in claim 1, wherein thermal energy from both the first exhaust gas flow and the second exhaust gas flow is communicated to the evaporator system for generating the steam flow.

3. The aircraft propulsion system as recited in claim 1, wherein the second exhaust gas flow has a smaller flow volume than the first exhaust gas flow.

4. The aircraft propulsion system as recited in claim 1, wherein the core exhaust gas separator is configured to utilize a radially directed flow to separate components of the exhaust gas flow by molecular weight.

5. The aircraft propulsion system as recited in claim 4, wherein core exhaust gas separator includes an outer outlet in communication with a first exhaust gas passage for the first exhaust gas flow and an inner outlet in communication with a second exhaust passage for the second exhaust gas flow.

6. The aircraft propulsion system as recited in claim 5, wherein the core exhaust gas separator includes a separator portion disposed within an axial length between a rotating blade of the turbine section and an exit guide vane and the outer outlet and the inner outlet are disposed proximate the exit guide vane.

7. The aircraft propulsion system as recited in claim 5, wherein the core exhaust gas separator includes a separator portion disposed within an axial length between a rotating blade of the turbine section and an exit guide vane and inner outlet is disposed upstream of the exit guide vane and at an angle relative to an engine longitudinal axis.

8. The aircraft propulsion system as recited in claim 7, wherein the inner outlet is only partially annular about the longitudinal axis.

9. The aircraft propulsion system as recited in claim 6, wherein separator portion includes a radially outward curved portion for increasing rotational acceleration of the exhaust gas flow.

10. The aircraft propulsion system as recited in claim 6, further including a fixed swirling vane assembly disposed within the separator portion that is configured to induce swirling in exhaust gas flow entering the separator portion, wherein the fixed swirling vane assembly comprises multiple swirling vanes spaced circumferentially about an axis of rotation within the separator portion.

11. The aircraft propulsion system as recited in claim 6, wherein the rotating blade comprises an aft most rotating blade and the turbine section includes a second rotating blade immediately upstream of the aft most rotating blade without a stator vane disposed therebetween.

12. The aircraft propulsion system as recited in claim 1, wherein the core exhaust gas separator is annular about an engine axis.

13. A steam generation system for a turbine engine assembly, the water extraction system comprising:
a core exhaust gas separator where an exhaust gas flow is separated into a first exhaust gas flow and a second exhaust gas flow, wherein the second exhaust gas flow contains more water than the first exhaust gas flow, wherein the core exhaust gas separator is configured to utilize a radially directed flow to separate components of the exhaust gas flow by molecular weight;
a condenser configured to receive and extract water from only the second exhaust gas flow; and
an evaporator system where thermal energy from the exhaust gas flow is utilized to generate a steam flow from at least a portion of water extracted by the condenser for injection into a core flow path of a turbine engine.

14. The steam generation system as recited in claim 13, wherein core exhaust gas separator includes an outer outlet in communication with a first exhaust gas passage for the first exhaust gas flow and an inner outlet in communication with a second exhaust passage for the second exhaust gas flow.

15. The steam generation system as recited in claim 14, wherein the separator portion includes a radially outward curved portion for increasing rotational acceleration of the exhaust gas flow.

16. The steam generation system as recited in claim 15, further including a fixed swirling vane assembly disposed within the separator portion that is configured to induce swirling in exhaust gas flow entering the separator portion.

17. A method of generating steam for injection into a core flow path of a turbine engine, the method comprising:

separating an exhaust gas flow into a first exhaust gas flow and a second exhaust gas flow, wherein the second exhaust gas flow contains more water than the first exhaust gas flow and is of a smaller flow volume than the first exhaust gas flow;

cooling only the second exhaust gas flow to condense water into a liquid form; and extracting liquid water from only the second exhaust gas flow.

18. The method as recited in claim 17, further including heating the extracted liquid water to generate a steam flow for communication to a core flow path.

19. The method as recited in claim 17, wherein separating the exhaust gas flow comprises generating a swirling flow in the exhaust gas flow to communicate heavier components through an outer outlet as part of the first exhaust gas flow and communicating more water through an inner outlet that the outer outlet as the second exhaust gas flow.

* * * * *